(12) United States Patent
Michel et al.

(10) Patent No.: US 6,885,545 B2
(45) Date of Patent: Apr. 26, 2005

(54) CAPACITOR ELECTRODES

(75) Inventors: Hartmut Michel, Heidenheim (DE); Thomas Scholz, Heidenheim (DE); Christoph J. Weber, Heidenheim (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 10/502,068

(22) PCT Filed: Jan. 24, 2003

(86) PCT No.: PCT/SE03/00196
§ 371 (c)(1),
(2), (4) Date: Jul. 21, 2004

(87) PCT Pub. No.: WO03/065390
PCT Pub. Date: Aug. 7, 2003

(65) Prior Publication Data
US 2004/0264110 A1 Dec. 30, 2004

(30) Foreign Application Priority Data
Jan. 28, 2002 (DE) ........................ 102 03 143

(51) Int. Cl.$^7$ .............................. H01G 9/00; H01G 9/04; H01G 9/145
(52) U.S. Cl. ........................ 361/502; 361/508; 29/25.03
(58) Field of Search ................................ 361/502–503, 361/508–511, 516, 528–530, 532; 29/25.03

(56) References Cited

U.S. PATENT DOCUMENTS

| | | | |
|---|---|---|---|
| 4,482,931 A | 11/1984 | Yializis | |
| 4,920,452 A | 4/1990 | Lackey | |
| 5,150,283 A | 9/1992 | Yoshida et al. | |
| 5,369,547 A | * 11/1994 | Evans | 361/516 |
| 5,737,181 A | * 4/1998 | Evans | 361/504 |
| 6,198,621 B1 | 3/2001 | Saito et al. | |
| 6,447,555 B1 | * 9/2002 | Okamura et al. | 29/25.03 |
| 6,740,351 B2 | 5/2004 | Schoch et al. | |
| 2002/0093783 A1 | 7/2002 | Bendale et al. | |
| 2002/0097550 A1 | * 7/2002 | Shimada et al. | 361/532 |
| 2003/0003685 A1 | 1/2003 | Schoch et al. | |
| 2003/0112581 A1 | * 6/2003 | Kwon et al. | 361/502 |

FOREIGN PATENT DOCUMENTS

DE 19961840 7/2001

* cited by examiner

Primary Examiner—Eric Thomas
(74) Attorney, Agent, or Firm—Fish & Richardson P.C.

(57) ABSTRACT

An electrode includes a current collector that is two-dimensional in shape and that contains perforations, and an intermediate layer that is electrically conductive and substantially corrosion-resistant. The intermediate layer is on at least part of a first surface of the current collector, and includes at least one of precious metal, graphitic carbon, a metal nitride, and a metal carbide. A first electrode layer is on the intermediate layer. At least part of the first electrode layer is in at least some perforations of the current collector. The first electrode layer, the intermediate layer, and the current collector are bonded together.

24 Claims, 4 Drawing Sheets

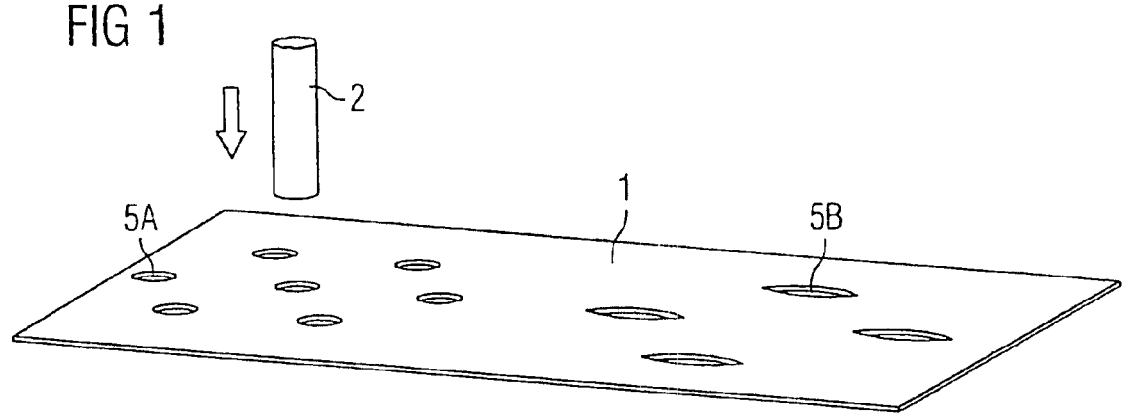
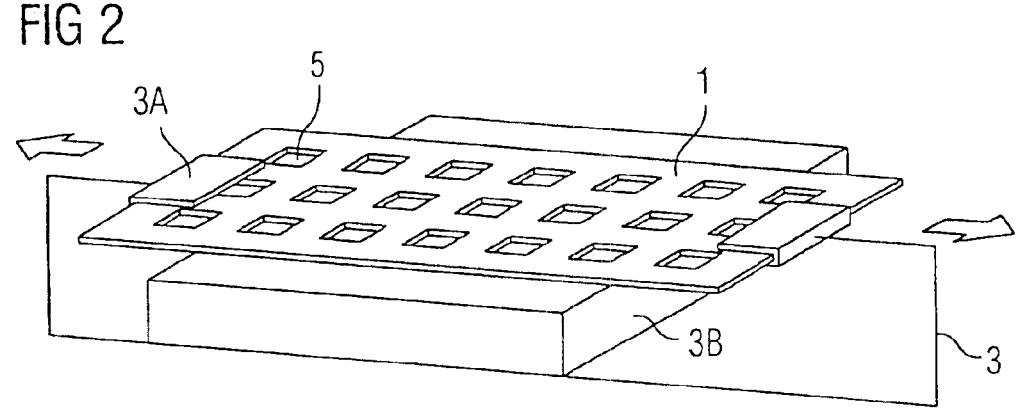

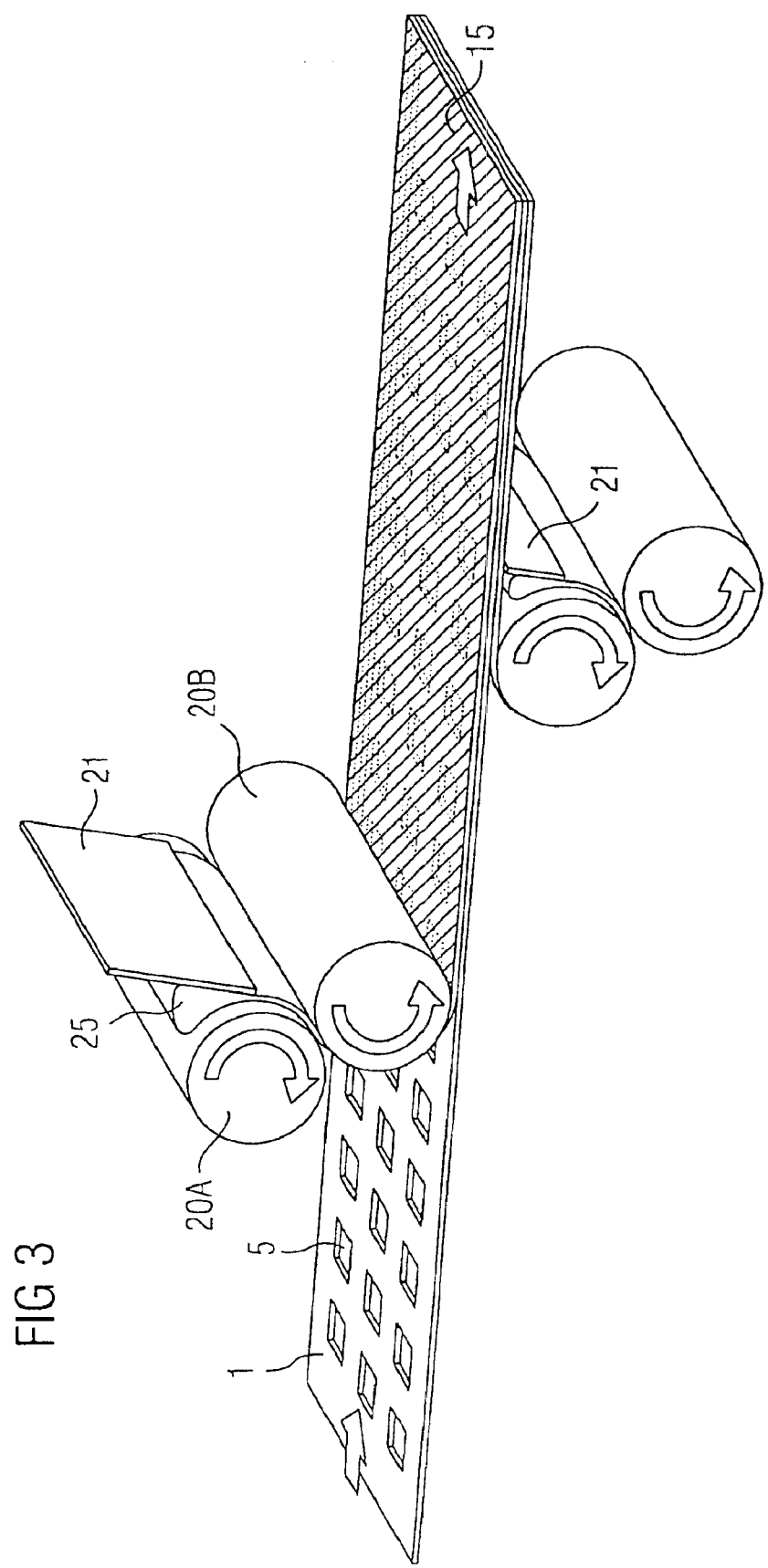

CAPACITOR ELECTRODES

BACKGROUND

The electrodes of some electric components, such as pseudo-capacitors and electrochemical double-layer capacitors, contain, as electrode material, activated carbon, metal oxides, such as ruthenium, nickel and manganese oxide, or conductive polymers, such as polythiophenes, polyanilines, or polypyrroles. This electrode material is frequently applied in powder form to current collectors with favorable electrical conductivity characteristics or produced on the current collectors via chemical or electrochemical deposition processes. The electrically conductive current collectors are frequently present in the form of thin metal foils, such as aluminum foils. In the case of aluminum foils, the aluminum oxide on the surface of the foil, which increases electric resistance, is removed by etching, for example, so that the electrically conductive intermediate layer and then the electrode material can be subsequently applied. The surface of the aluminum foil is frequently enhanced by producing a surface topography via etching, for example. This enhances the surface of the electrodes, thereby resulting in capacitors with higher capacitance.

To improve the bond between the current collector and the electrode material, an electrically conductive intermediate layer, such as graphitic carbon, is frequently applied to the current collector. To some extent, the particles of the intermediate layer can also be mixed into the electrode material.

Especially in the case of electrochemical double-layer capacitors for high-performance applications, the current collectors and the electrode materials arranged thereon are produced as thinly as possible, so that a large area of electrodes connected in parallel can be incorporated into a predetermined capacitor volume. As a result, the volume-specific bonding resistance between the current collector and the electrode layer is reduced, leading to more powerful capacitors.

As a result of stress caused by electrical operation or temperature change, the contact between the electrode coating on the electrode material and the current collector deteriorates. This leads to an increase in the serial resistance of the capacitor, and thus to higher resistive losses during the operation of these capacitors. This increase in serial resistance is caused by corrosive effects on the surface of the current collector and separation of the electrically conductive intermediate layer from the surface of the current collector.

SUMMARY

It is, therefore, a goal of the present invention to provide an electrode that does not demonstrate an increase in serial resistance during the operation of the electrical component.

This goal is achieved with an electrode according to claim 1. Advantageous embodiments of the electrode, as well as method of its manufacture, are the subject of further claims.

An electrode according to the invention includes a two-dimensionally shaped, electrically conductive current collector, which contains perforations. Each perforation passes through two opposing main surfaces of the current collector, thereby forming a continuous hole in the current collector. On at least one main surface of the current collector and in these perforations, a first electrode layer is arranged which is form fitting with the current collector and tightly bonded to the current collector. The electrode layer can cover the perforations and be arranged in their perforations, wherein the edges of the perforations between the opposing main surfaces can also be covered by the electrode layer. Also present is an electrically conductive, corrosion-resistant intermediate layer, which is form-fittingly arranged between the current collector and the electrode layer, wherein the intermediate layer comprises materials that are selected from: precious metals, graphitic carbon, metal nitrides and metal carbides.

The electrically conductive, corrosion-resistant intermediate layer, which is form-fittingly arranged between the current collector and the electrode layers, serves to improve the bond between the current collector and the first and, if applicable, second electrode layer. The intermediate layer is then arranged on the current collector and in its perforations, wherein the electrode layers are then arranged on the intermediate layer.

It is also possible that the intermediate layer is completely arranged on the current collector; that is, it completely covers the main surface of the current collector. In this case, an especially strong bond between the current collector and the electrode layers is possible.

Because of the perforations in the current collector and the positive fit, the first electrode layer can be applied to the current collector in a well-adhering manner. In this process, the perforations result in an especially tight "interlocking" between the current collector and the electrode layer arranged thereon. Because of this close contact between the current collector and the first electrode layer, electrodes according to the invention demonstrate particular stability during electrical operation, in capacitors, for example. In electrodes according to the invention, the above-mentioned corrosion effects and the separation of the intermediate layer from the surface of the current collector do not occur to the degree to which they occur in conventional electrodes.

In an advantageous embodiment of the electrode according to the invention, a second electrode layer is arranged on the other main surface of the current collector. In this advantageous embodiment of the electrode layer according to the invention, the first and second electrode layers, which are arranged on the two opposing main surfaces of the current collector, can bond to one another in the perforations of the current collector, resulting in especially strong adhesion of the electrode layers to the current collector. In this variant of the electrode according to the invention, a separation of the two electrode layers and consequently the above-mentioned corrosion effects can therefore be prevented especially effectively during electrical operation. In this arrangement, it is possible for the first and second electrode layers to be made of the same material.

In the case of the series connection of electrodes, such as the capacitors in a capacitor battery, it can be advantageous to use first and second electrode layers made of different materials. In this arrangement, it is possible, and especially advantageous, to produce individual capacitors in a capacitor battery, the capacitors demonstrating different electrical properties as a result of their different electrode layers.

The current collector can comprise a punched and elongated aluminum foil. In this arrangement, it is possible that the perforations, e.g., in the form of holes or slits, are punched in the current collector, which is then elongated by stretch-forming it. Stretch forming, in this arrangement, also increases, advantageously, the two-dimensional expansion of the current collector. If the current collector consists of a metal foil, the perforations, in a current collector according to the invention, can comprise between 25 and 70 percent of the surface area of the projection surface of the metal foil.

It is also possible that the current collector comprises a net of metal wires, which, for example, is woven from aluminum, nickel or rust-free stainless steel wires. In this case, the mesh in the net represents the perforations. At the same time, the perforations increase the contact surface between the collector and the electrode layer, resulting in especially powerful capacitors with low series resistance values. The close bond between the current collector and the intermediate layer, which may be present, and the electrode layers, especially in the perforations, simultaneously increases the long-term stability of the electrodes.

Foam metals can also be used as current collectors with perforations. These metals are foamed and made porous via gas formation in the melt. The gases form bubbles in the metal, and these bubbles form hollow spaces in the metal foam once the metal has cooled and hardened. The walls of these hollow spaces are very thin in comparison to the areas of the foam metal in which there are no hollow spaces. By selectively etching these areas of the foam metal, e.g., with acids or bases, the hollow spaces can be opened on both sides, so that continuous openings, or perforations, can be produced. Aluminum and/or nickel, for example, can be used as the metal.

The intermediate layer can comprise precious metals, such as gold and silver, as well as inorganic, corrosion-resistant materials, such as carbon, in the form of graphite, for example, as well as metal nitrides and carbides, such as TiN, TiC, tungsten nitrides, and tungsten carbides. Electrically conductive polymers can also be used. It is also possible to mix the material used as the intermediate layer into the actual electrode material, making it possible to achieve an especially strong bond.

The first and/or second electrode layer can comprise conductive polymers, such as polythiophenes, polyanilines, or polypyrroles, as well as activated carbon. These materials allow for a tight interlocking between the current collector and the electrode layers, so that an intermediate layer is not needed to improve the bond. It is also possible that the first and/or second electrode layer comprises metal oxides, such as the previously mentioned ruthenium, nickel or manganese oxides.

An electrochemical double-layer capacitor is also an object of the invention. It comprises the electrodes of the invention, which are arranged opposite one another, wherein a porous separator is arranged between the electrodes. The separator and the electrodes are impregnated with an electrolyte. In this arrangement, carbon, in the form of activated carbon or graphite, is used as an electrode material, for example.

Electrodes according to the invention are also advantageous in hybrid capacitors, in which case a first electrode according to the invention comprises carbon and is arranged opposite a second electrode according to the invention, which comprises metal oxides and/or electrically conductive polymers. A porous separator is again arranged between the electrodes, the electrodes and the separator being impregnated with an electrolyte. Electrodes according to the invention can also be used in the pseudo-capacitors that comprise two electrodes, which either comprise electrically conductive polymers alone or metal oxides.

It is advantageous to use porous polymer films, non-wovens, felts or woven materials made of polymers or fiberglass, as well as paper, as separators.

Because of the electrodes according to the invention, both the electrochemical double-layer capacitors and the pseudo-capacitors demonstrate improved permanent series resistance during operation.

A method of producing an electrode according to the invention consists, in its most general form, of two process steps. In a process step A), a two-dimensionally shaped current collector containing perforations is produced. Then, in a subsequent process step B1), an electrically conductive, corrosion-resistant intermediate layer is produced on the current collector, this intermediate layer comprising materials selected from among:—precious metals, graphitic carbon, metal nitrides and metal carbides. Then, in a process step B), an electrode layer is produced on at least one main surface of the current collector in such a manner that it is form-fittingly and tightly bonded to the current collector.

In an advantageous embodiment of the method according to the invention, the electrode layer can also be produced on both main surfaces of the current collector in process step B).

To produce the current collector in process step A), it is possible to punch continuous holes into a metal foil, for example, and then to further treat the metal foil by stretch-forming it. During stretch forming, the metal foil flows primarily out of its thickness, wherein the surface of the metal foil becomes enlarged in comparison to its condition prior to stretch forming. A person skilled in the art is familiar with the process of stretch forming, which is generally performed by placing the metal foil into a clamping tool and then stretching it. When subjected to a considerable stretching force, the metal foil begins to flow as its thickness decreases. It is also possible to slit the metal foil and then subject it to stretch forming, so that the continuous holes (perforations) are only formed during the stretch forming. The thickness of the stretched metal foil generally ranges between 20 and 100 micrometers, wherein approximately 25 to 70 percent of the surface area of the originally untreated metal foil is removed by the production of the perforations, resulting in the formation of the continuous holes.

The continuous holes in the metal foil can also be formed via contactless processes, e.g., by a laser burning the holes into the metal foil. Subsequently, the surface of the metal foil can be enlarged by means of the stretch forming described above.

It is also possible to produce the current collector by weaving metal wires into a metal net. In this process, the continuous holes are formed by the spaces in the metal net. It is advantageous to use aluminum, nickel or rust-free stainless wires.

If an aluminum foil is used as the metal foil for the current collector, it is advantageous, prior to process steps B1) and B), to remove surface layers of the foil in a separate process step A1) to improve the conductivity of the current collector. Aluminum foil often contains a poorly conductive aluminum oxide surface layer, which can be stripped off. This can be achieved by chemical, galvanic process steps, or by plasma etching, all of which are known to a person skilled in the art.

In process step B1), the electrically conductive intermediate layer, in the form of a metal layer for example, can be produced via a galvanic process or by chemical vapor deposition (CVD) or physical vapor deposition (PVD). In chemical vapor deposition, metals or carbon are often deposited out of the gas phase. Physical vapor deposition is generally accomplished by applying ionized particles in an electric field. It is also possible, in process step B1), to produce a carbon layer comprised, for example, of graphitic carbon as an electrically conductive intermediate layer, by means of dip coating in a carbon bath. To this end, the current collector is placed into a dipping bath containing graphitic carbon with aqueous or organic solvents, such as alcohols, which can then be vaporized. If the intermediate layer is executed in the form of a metal layer, it is advantageous to use, in particular, corrosion-inhibiting metals, e.g., noble metals such as gold or silver.

In process step B), the electrode layer can then be produced via blade coating with a liquid or viscous phase containing an electrode material. It is also possible to first apply the liquid or viscous phase containing the electrode material to a carrier foil, such as a polytetrafluoroethylene foil, and then to dry it. The electrode material can then be transferred from the carrier foil to the current collector, thereby forming the electrode layer. This makes it possible, for example, to transfer the electrode material located on the carrier foil by laminating it onto the current collector. During this lamination process, the electrode layer to be applied becomes especially tightly and form-fittingly bonded to the current collector as well as its perforations. If electrode layers are produced on both main surfaces of the current collector, they can become bonded together in the perforations, as mentioned earlier, so that the current collector is enclosed in an especially well-adhering manner. The carrier foil does not melt during application of the electrode layer. Instead, it can be peeled off after the electrode layer has been transferred to the current collector. It is advantageous to apply the electrode material to the carrier foil mixed with a binder. In this case, the transfer of the electrode material to the current collector is achieved by melting the binder. Polypropylene powder, for example, can be used as the binder.

In the following, the invention will be explained in greater detail, using exemplary embodiments and figures.

DESCRIPTION OF THE DRAWINGS

FIGS. 1 and 2 show the production of the current collector with the perforations, in process step A).

FIG. 3 shows the application of the electrode paste by means of reverse roller coating, in process step B).

DETAILED DESCRIPTION

Figure 4:
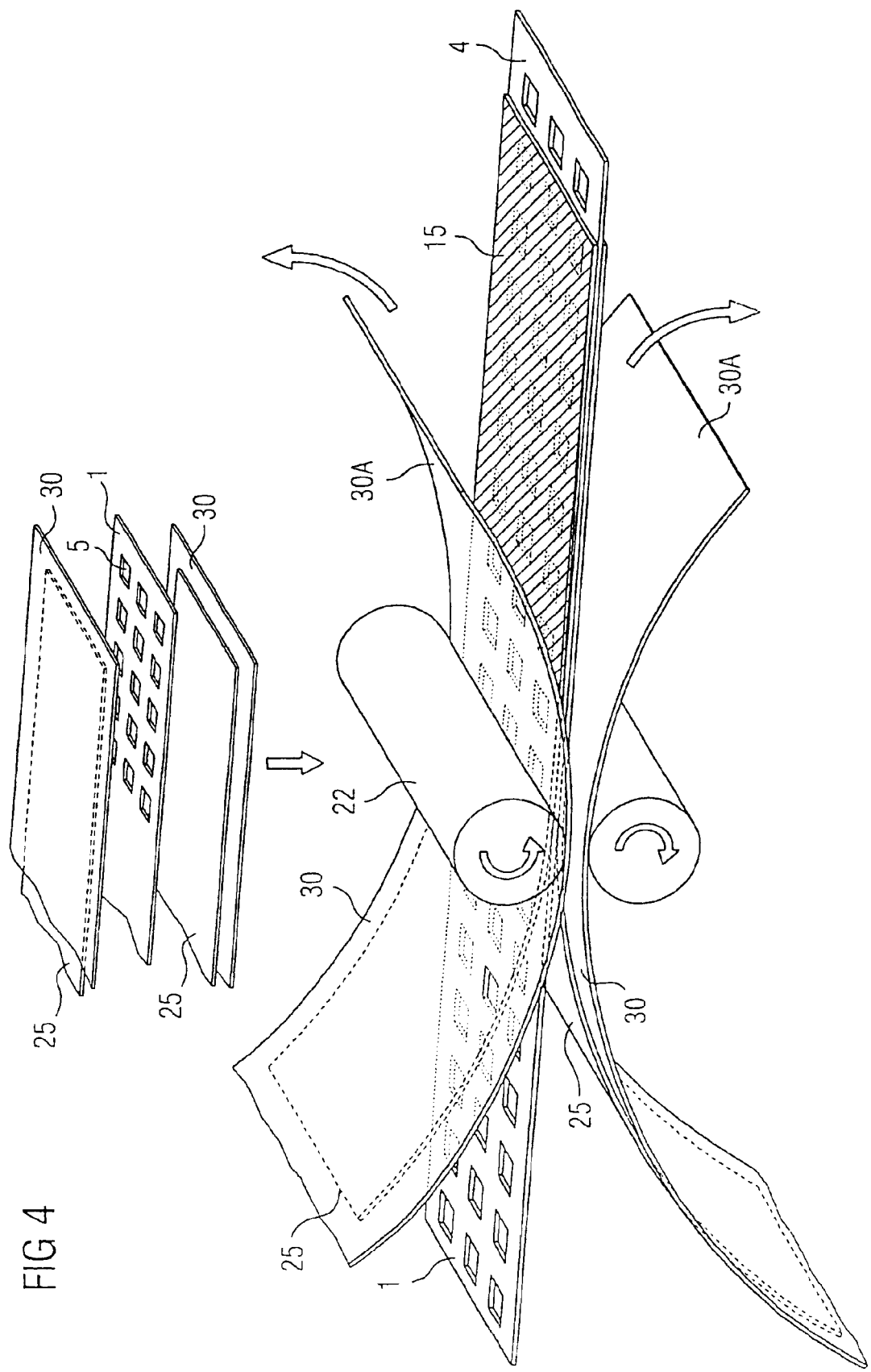
FIG. 4 shows the application of the electrode paste by means of lamination, using a carrier foil.

FIG. 1 shows how, in process step A), perforations are produced in the current collector 1, which is depicted here as a metal foil. These perforations in the metal foil can be produced in the form of continuous holes 5A via a punching tool 2, or perforations can be produced in the form of slits 5B. For space-saving reasons, the two alternatives forms of the perforations are shown in one figure.

FIG. 2 shows how, in process step A), the current collector 1, in the form of a metal foil, is stretched by means of stretch-forming following production of the perforations 5. To this end, the current collector can be clamped into a stretch-forming press 3, comprised of tongs 3A and a stretching table 3B, for example. The stretched current collector can be obtained by pulling apart the tongs, although it is also possible to expand the slits 5B by means of stretch forming. At the same time, the stretch forming also increases the surface area of the current collector in an advantageous manner. The arrows schematically depict the direction of stretch forming.

FIG. 3 shows process step B) of the method according to the invention, in which the electrode paste 25, which can be present in a liquid or viscous phase, is transferred to the current collector 1 by reverse roller coating. During reverse roller coating, the electrode material 25 is uniformly transferred to the roller 20B, using a blade 21 on the roller 20A. This roller then uniformly transfers the electrode material onto the current collector 1. It is also possible to transfer the electrode material to the current collector via a blade coating process. In this arrangement, it is possible to cover only one main surface of the current collector with the electrode material or, as shown in the figure, both main surfaces.

FIG. 4 shows how the electrode layer 15 can be produced on the current collector 1 via an alternative process, lamination, using a carrier foil 30. To this end, the electrode material 25 is first applied to the carrier foil 30 and then dried. Then the carrier foil is brought into contact with the current collector in such a way that the electrode material 25 arranged thereon bonds to the current collector directly. Then the electrode material can be transferred from the carrier foil 30 to the current collector by rolling hot laminating rolls 22 across the carrier foil, so that the electrode material becomes tightly bonded to the current collector. In this process, the perforations 5 in the current collector provide for an especially intimate and form-fitting application of the electrode material. If, as shown in FIG. 4, electrode layers are produced on both main surfaces of the current collector, they can come into direct contact with one another in the perforations 5 of the current collector, thereby enclosing said current collector especially tightly and form-fittingly. After lamination, the then separated carrier foil 30A can be pulled off. For bonding the electrodes, it is possible to leave an area 4 of the current collector free of electrode material, so that electrical terminals can later be connected in the completed electrical component by means of this bonding area 4.

Figure 5:
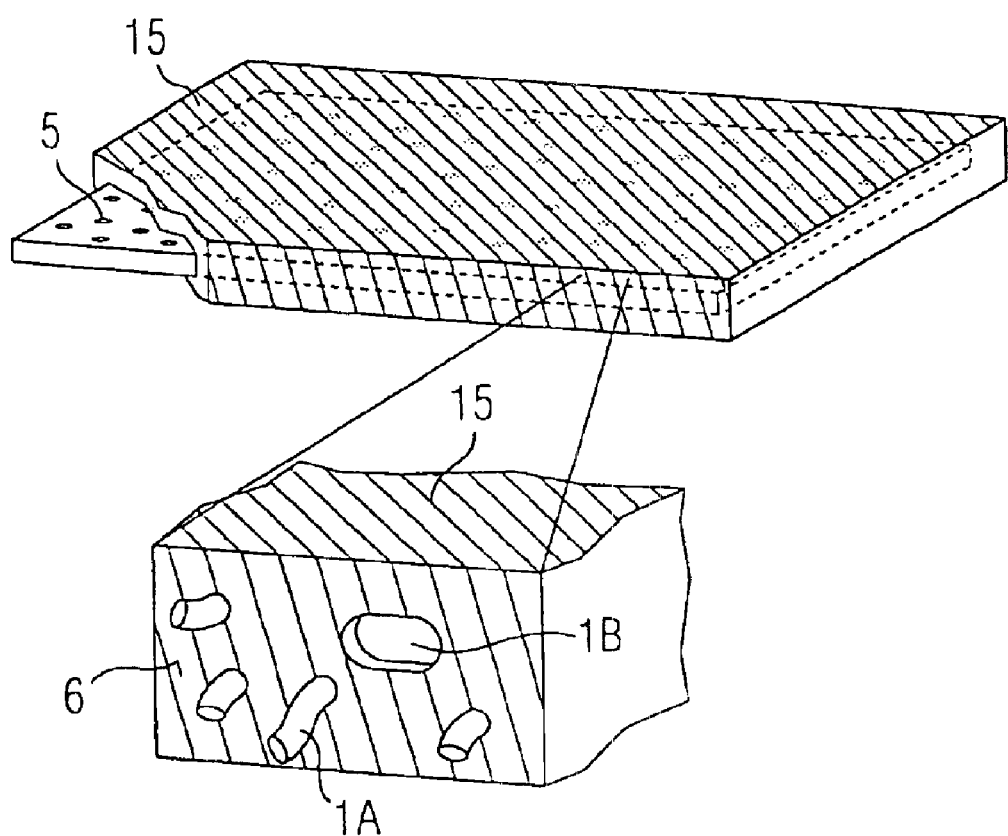
FIG. 5 shows a complete electrode with an enlarged section of the lip.

FIG. 5 shows a completed electrode with perforations 5 and the electrode layer 15. An enlarged segment of a lip 6 shows that parts of the current collector that are not covered by the electrode layer are still visible on the lip. If the current collector is a net of metal wires, it is possible, for example, that individual wires 1A protrude from the electrode layer and/or that, in the case of current collectors consisting of nets, metal foils or metal foams, areas 1B are not covered by the electrode layer 15. These areas can be used for the subsequent bonding of an electrical terminal.

In an exemplary embodiment, a perforated aluminum expanded metal having a thickness of 30 to 50 micrometers is initially treated with a hydrogen plasma, so that interfering surface oxide can be removed (process step A1). In a subsequent sputter process (process step B1), a copper layer or carbon layer can be applied to this current collector, on both sides for example, as an intermediate layer. It is also possible, in process step A), to dip the current collector, in the form of an aluminum expanded metal, into a solution that etches the surface oxide and, in the same bath or an immediately adjacent bath, to apply an intermediate layer consisting of carbon, such as graphitic carbon. Both the copper layer and the carbon layer, as intermediate layers, are effectively electrically conductive and are not corroded by oxygen during subsequent process steps, which makes them corrosion-resistant. In process step B), the electrode material, in the form of activated carbon power, is initially blade-coated as a layer with a thickness of ca. 70 micrometers, together with a binder, such as polypropylene powder, polytetrafluoroethylene or polyvinyl difluoride, and a solvent, such as acetone, heptane, tetrahydrofurane or water, onto a polytetrafluoroethylene foil as the carrier foil. Following vaporization of the solvent, these prepared layers are then rolled onto both sides of the current collector (laminated). The laminating rollers are heated to ca. 170° C. This causes the binder to melt, so that the electrode material 25 is transferred to the current collector 1, forming the electrode layer 15 and producing a homogeneous coating of the collector. In this case, the actual electrode material, the activated carbon powder, is incorporated into a matrix consisting of binder (polypropylene), thereby forming the electrode layer.

The electrodes according to the invention and/or the method for their production is not limited to the exemplary embodiment described here. Variations are possible, especially with regard to the electrode materials used, the materials for the current collector foil, and the shapes of the perforations in the current collector foil.

What is claimed is:

1. An electrode comprising:
  a current collector that is two-dimensional in shape and that contains perforations;
  an intermediate layer that is electrically conductive and substantially corrosion-resistant, the intermediate layer being on at least part of a first surface of the current collector, the intermediate layer comprising at least one of a precious metal, graphitic carbon, a metal nitride and a metal carbide; and
  a first electrode layer that is on the intermediate layer, at least part of the first electrode layer being in at least some perforations of the current collector; the first electrode layer, the intermediate layer and the current collector being bonded together.

2. The electrode of claim 1, further comprising:
  a second electrode layer adjacent to a second surface of the current collector.

3. The electrode of claim 2, wherein the first and second electrode layers comprise a same material.

4. The electrode of claim 1, wherein the intermediate layer is substantially continuous on the current collector.

5. The electrode of claim 1, wherein the current collector comprises an elongated aluminum foil.

6. The electrode of claim 1, wherein the current collector comprises a net of metal wires.

7. The electrode of claim 1, wherein the current collector comprises an etched foam metal.

8. The electrode of claim 1, wherein the first electrode layer comprises a conductive polymer.

9. The electrode of claim 1, wherein the first electrode layer, comprises activated carbon.

10. The electrode of claim 1, wherein the first electrode layer comprises a metal oxide.

11. A method for producing an electrode, comprising:
  producing an intermediate layer on a first surface of a current collector, the intermediate layer being electrically conductive and corrosion resistant, the current collector being two-dimensional in shape and having perforations, the intermediate layer comprising at least one of a precious metal, graphitic carbon, a metal nitride, and a metal carbide; and
  producing an electrode layer on the intermediate layer; the electrode layer, the intermediate layer, and the current collector being bonded together.

12. The method of claim 11, further comprising producing a second electrode layer adjacent to a second surface of the current collector.

13. The method of claim 11, further comprising:
  forming the perforations by punching perforations in a metal foil; and
  stretching the metal foil to produce the current collector.

14. The method of claim 13, wherein the metal foil comprises aluminum; and
  wherein the method further comprises removing surface layers of the metal foil prior to producing the intermediate layer in order to improve a conductivity of the metal foil.

15. The method of claim 11, further comprising: producing the current collector by weaving metal wires into a metal net.

16. The method of claim 11, wherein the intermediate layer comprises a metal layer that is produced by a galvanic process, a CVD process, or a PVD process.

17. The method of claim 11, wherein the intermediate layer comprises a carbon layer that is produced by dip coating the current collector in a carbon bath.

18. The method of claim 11, wherein the electrode layer is produced by blade coating a liquid phase containing an electrode material or a viscous phase containing the electrode material.

19. The method of claim 18, wherein blade coating comprises:
  applying the liquid phase or the viscous phase to a carrier foil;
  drying the liquid phase or the viscous phase leaving the electrode material; and
  transferring the electrode material from the carrier foil to the current collector containing the intermediate layer.

20. The method of claim 19, further comprising mixing the electrode material with a binder prior to applying the liquid phase or the viscous phase to the carrier foil
  wherein the electrode material is transferred from the carrier foil to the current collector by melting the binder.

21. The method of claim 18, wherein the electrode material comprises at least one of activated carbon, a metal oxide, or a conductive polymer.

22. An electrochemical double-layer capacitor, comprising:
  plural electrodes, at least one of the plural electrodes comprising:
    a current collector that is two-dimensional in shape and that contains perforations;
    an intermediate layer that is electrically conductive and substantially corrosion-resistant, the intermediate layer being on at least part of a first surface of the current collector, the intermediate layer comprising at least one of precious metal, graphitic carbon, a metal nitride, and a metal carbide; and
    a first electrode layer that is on the intermediate layer, at least part of the first electrode layer being in at least some perforations of the current collector; the first electrode layer, the intermediate layer and the current collector being bonded together, the first electrode layer comprising at least one of activated carbon and graphitic carbon; and
  a porous separator between at least two of the plural electrodes;
  wherein at least one of the plural electrodes and the porous separator contain an electrolyte.

23. A hybrid capacitor, comprising:
  a first electrode;
  a second electrode; and
  porous separator between the first electrode and the second electrode;

wherein the first and second electrodes and the porous separator contain an electrolyte;

wherein the first electrode comprises:

a first current collector that is two-dimensional in shape and that contains perforations;

a first intermediate layer that is electrically conductive and substantially corrosion-resistant, the first intermediate layer being on at least part of a first surface of the first current collector, the first intermediate layer comprising at least one of precious metal, graphitic carbon, a metal nitride and a metal carbide; and a first electrode layer that is on the first intermediate layer, at least part of the first electrode layer being in at least some perforations of the first current collector; the first electrode layer, the first intermediate layer and the first current collector being bonded together, the first electrode layer comprising at least one of active carbon and graphitic carbon; and wherein the second electrode comprises:

a second current collector that is two-dimensional in shape and that contains perforations;

a second intermediate layer that is electrically conductive and substantially corrosion-resistant, the second intermediate layer being on at least part of a second surface of the second current collector, the second intermediate layer comprising at least one of precious metal, graphitic carbon, a metal nitride, and a metal carbide; and a second electrode layer that is on the second intermediate layer, at least part of the second electrode layer being in at least some perforations of the second current collector; the second electrode layer, the second intermediate layer and the second current collector being bonded together, the second electrode layer comprising at least one of an electrically conductive polymer and a metal oxide.

24. A pseudo-capacitor, comprising:

plural electrodes, at least one of the plural electrodes comprising:

a current collector that is two-dimensional in shape and that contains perforations;

an intermediate layer that is electrically conductive and substantially corrosion-resistant, the intermediate layer being on at least part of a first surface of the current collector, the intermediate layer comprising at least one of precious metal, graphitic carbon, a metal nitride, and a metal carbide; and a first electrode layer that is on the intermediate layer, at least part of the first electrode layer being in at least some perforations of the current collector; the first electrode layer, the intermediate layer and the current collector being bonded together, the first electrode layer comprising either a metal oxide or a conductive polymer; and a porous separator between at least two of the plural electrodes;

wherein at least one of the plural electrodes and the separator contain an electrolyte.

* * * * *

UNITED STATES PATENT AND TRADEMARK OFFICE
CERTIFICATE OF CORRECTION

PATENT NO. : 6,885,545 B2  Page 1 of 1
APPLICATION NO. : 10/502068
DATED : April 26, 2005
INVENTOR(S) : Hartmut Michel, Thomas Scholz and Christoph Weber It is certified that error appears in the above-identified patent and that said Letters Patent is hereby corrected as shown below:

On Title Page, Column 1, item 86

Delete "PCT/SE03/00196" and insert -- PCT/DE03/00196--

Signed and Sealed this

Nineteenth Day of December, 2006

JON W. DUDAS
*Director of the United States Patent and Trademark Office*